United States Patent [19]

Jackson

[11] Patent Number: 5,812,782

[45] Date of Patent: *Sep. 22, 1998

[54] HOST CENTRAL PROCESSORS WITH ASSOCIATED CONTROLLER TO CAPTURE A SELECTED ONE OF A NUMBER OF MEMORY UNITS VIA PATH CONTROL COMMANDS

[75] Inventor: Gary Edward Jackson, Lake Forest, Calif.

[73] Assignee: Unisys Corp, Blue Bell, Pa.

[*] Notice: The term of this patent shall not extend beyond the expiration date of Pat. No. 5,504,926.

[21] Appl. No.: 850,888

[22] Filed: May 2, 1997

Related U.S. Application Data

[62] Division of Ser. No. 625,662, Mar. 29, 1996, Pat. No. 5,630,169, which is a division of Ser. No. 949,967, Sep. 24, 1992, Pat. No. 5,504,926.

[51] Int. Cl.⁶ ............................. G06F 13/14; G06F 15/16
[52] U.S. Cl. ................... 395/200.56; 395/200.3; 395/439; 395/856
[58] Field of Search ...................... 395/825, 856, 395/475, 439, 200.3, 200.56

[56] References Cited

U.S. PATENT DOCUMENTS

| | | | |
|---|---|---|---|
| 4,747,043 | 5/1988 | Rodman | 364/200 |
| 4,747,047 | 5/1988 | Coogan et al. | 364/200 |
| 5,060,140 | 10/1991 | Brown et al. | 364/200 |
| 5,325,488 | 6/1994 | Carteau et al. | 395/275 |

*Primary Examiner*—Thomas C. Lee
*Assistant Examiner*—Rehana Perveen
*Attorney, Agent, or Firm*—Moru Storr; John McCormack

[57] ABSTRACT

A pair of data processing systems, each having a host CP and a controller, both systems to be operatively associated with a number of like memory units, each unit coupled to both controllers, wherein either host CP/controller can appropriate any "selected" memory unit by simply propagating "path-control-data" to memory in both controllers and in the selected memory unit.

3 Claims, 7 Drawing Sheets

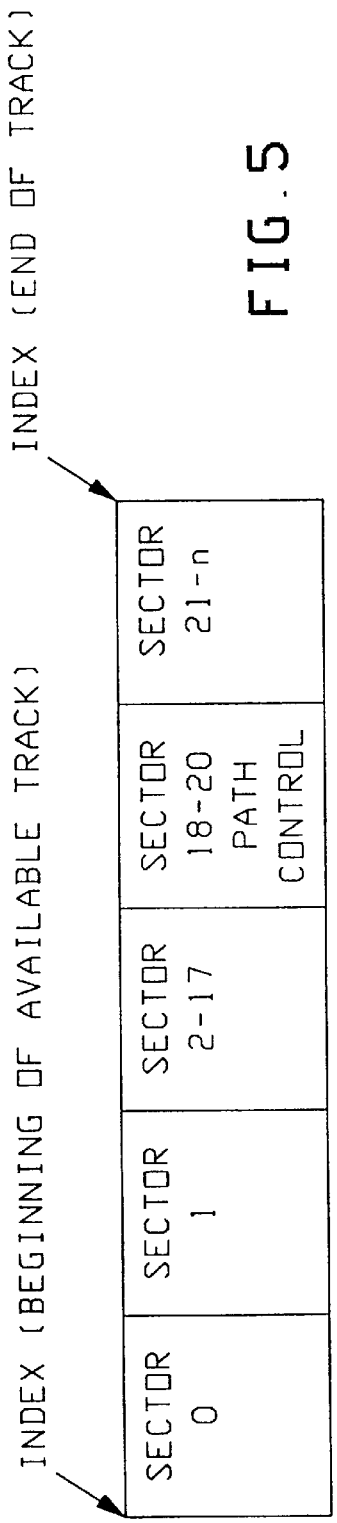
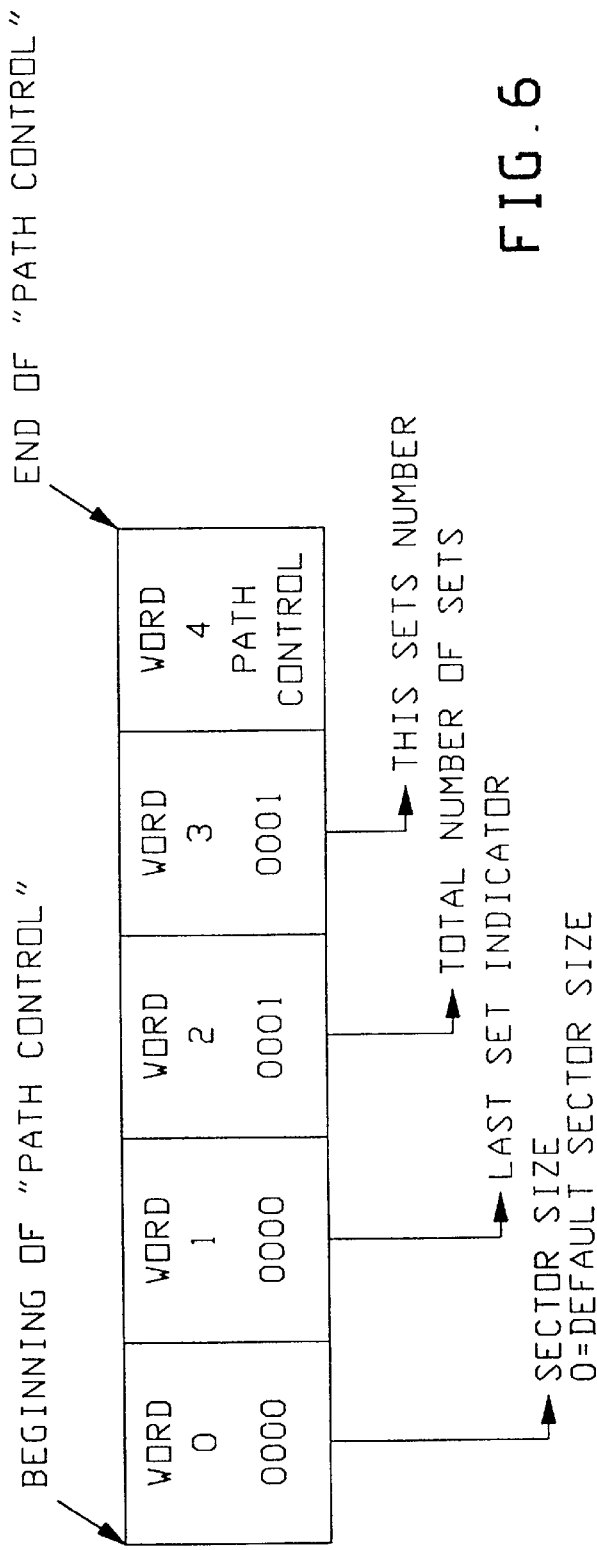

| BIT: | PATH CONTROL WORD |
|---|---|
| 15 | 1 = REQUEST PATH CONTROL INFORMATION |
| 14 | 1 = PATH CONTROL INFORMATION WRITTEN |
| 13 | 1 = PATH CONTROL INFORMATION RECEIVED |
| 12 | 1 = PATH CONTROL ERROR |
| 11-4 | UNUSED |
| 3 | 1 = IPI-3 CHANNEL WITH PATH MASK 3 ENABLED<br>0 = PATH MASK 3 DISABLED |
| 2 | 1 = IPI-3 CHANNEL WITH PATH MASK 2 ENABLED<br>0 = PATH MASK 2 DISABLED |
| 1 | 1 = IPI-3 CHANNEL WITH PATH MASK 1 ENABLED<br>0 = PATH MASK 1 DISABLED |
| 0 | 1 = IPI-3 CHANNEL WITH PATH MASK 0 ENABLED<br>0 = PATH MASK 0 DISABLED |

FIG. 7

| BIT: | CONTROLLER | | | |
|---|---|---|---|---|
| | EVEN | | ODD | |
| | IPI-3 PORT | | IPI-3 PORT | |
| | 0 | 1 | 0 | 1 |
| 0 | 1 | N/A | N/A | N/A |
| 1 | N/A | 1 | N/A | N/A |
| 2 | N/A | N/A | 1 | N/A |
| 3 | N/A | N/A | N/A | 1 |

FIG. 10

| BIT: | CONTROLLER | | | |
|---|---|---|---|---|
| | EVEN | | ODD | |
| | IPI-3 PORT | | IPI-3 PORT | |
| | 0 | 1 | 0 | 1 |
| 0 | 0 | N/A | N/A | N/A |
| 1 | N/A | 1 | N/A | N/A |
| 2 | N/A | N/A | 0 | N/A |
| 3 | N/A | N/A | N/A | 1 |

FIG. 11

HOST CENTRAL PROCESSORS WITH ASSOCIATED CONTROLLER TO CAPTURE A SELECTED ONE OF A NUMBER OF MEMORY UNITS VIA PATH CONTROL COMMANDS

This is a division of U.S. Ser. No. 08/625,662, filed Mar. 29, 1996 and to issue May 13, 1997 as U.S. Pat. No. 5,630,169, which in turn is a division of U.S. Ser. No. 07/949,967, filed Sep. 24, 1992 now U.S. Pat. No. 5,504,926.

This invention relates to data processing systems having two or more controllers plus a plurality of memory units and particularly to means of facilitating communication between controllers.

BACKGROUND, FEATURES

Workers in data processing are aware that systems having two or more processors and a number of memory units are commonly used (e.g. see U.S. Pat. No. 4,920,484, 3,676,860).

Workers are also familiar with the practice of associating one or several host central processors (CPUs) with an array of memory units via intermediate controllers (e.g. see U.S. Pat. No. 4,982,324, 4,413,317, 3,889,237, 4,183,084, 3,623,014). And, today, it is not uncommon to operatively associate an array of peripheral storage units with a host computer via an appropriate controller device. FIG. 1 schematically suggests this for a host H and a number of like memory units D, connectable to H via a controller unit C, including suitable interfaces 1F, 1F' (e.g. see ports 1–4, each connected to a respective, like-numbered drive-port).

Similarly, it may often be desirable to so associate two (or more) host computers with a number of such memory units (storage devices) --e.g. as schematically indicated in FIG. 2, with one host H1 coupled to an associated controller C1, a second host H2, also coupled to a respective associated controller C2, and memory units D. If units D are dual-ported, as here indicated, they may be connectible to either host/controller array (as indicated by the port numbers).

"SHARED MEMORY LINKAGE" (FIG. 3)

Now, it may become desirable to mediate the competition between two host-computers to "capture" a selected memory unit (e.g. drive), using certain mediation means. Such a mediation means is the "Shared Memory Interface" (SMi) indicated in FIG. 3, shown in operative relation with eight dual-ported disk drives D0–D7 and a pair of host/controller arrays: host A16 with Controller A and host A17 with Controller B, plus suitable controller inter-faces, IPI-2, IPI-3. Workers should realize that mediation means SMi provides a communication link that allows one controller to request, or transmit, information to, or from, the other controller --here via what may be called "direct memory access" (DMA) something that requires special interfaces [e.g. additional special hardware, as "shared memory", SM, and associated interfaces I-A, I-B, (memory typically a dedicated random access memory RAM) and special software]. Shared memory, SM, also functions as a common storage unit that can be used to maintain "data path control": i.e. allow/disallow a host to write/read information to/from a selected disk drive.

PATH CONTROL

Workers will understand that such "Shared Memory Linkage" (as in FIG. 3) affords a degree of "path control": i.e. it provides a "Master" (e.g. an A-series host computer, from Unisys Corp.) with the ability to disenable/enable, or to assign, any port of a given disk drive to an IPI-2 port of a controller.

By way of illustration, assume that in FIG. 3, disk drive "path control information" is sent to a shared memory module, SM, which stores (disk drive) path control information in its random access memory (RAM) and controls access. If the module isn't "busy" (e.g. if the other controller isn't updating or otherwise accessing memory SM), it will load the information received into its designated path control memory location; and will then interrupt the other controller, indicating that "path control" for this disk drive has changed (similarly, note U.S. Pat. No. 3,735,360 that describes a similar "shared memory" configuration shared by CPUs in a multiprocessor array).

Here (FIG. 3), the host computers A16, A17 may preferably comprise Unisys A16, A17 computers (each dual-ported as shown), while their respective Controllers A, B may comprise compatible units such as, preferably, Unisys M-9730 units, with suitable interfaces. Preferably a Unisys IPI-3 type interface ("intelligent peripheral interface") is used to intercouple each host to its controller. The eight disk drives are coupled to both controllers via a suitable interface for each controller, preferably a Unisys IPI-2 type unit with four ports, each port connected to two drives, as illustrated.

"NATURAL LINKING" (no special mediation hardware)

FIG. 4 is a modification of FIG. 3, indicating as a feature of novelty hereof, what I call "Natural Linking" (of Controller); eliminating all special linking hardware such as the Shared Memory Interface" SMi or any such dedicated RAM or any special interfaces.

A salient feature of this "Natural Linking" is that it operates "Controller-to-Controller", using only a disk drive as its link, i.e. linking via means which are already part of the system (e.g. here only via a disk drive normally coupled to a M-9730 Controller, plus the "standard" IPI-2 interface normally used by this Controller). That is, here, the inter-controller linkage is "natural", using an already-present disk drive unit via an IPI-2 interface which is normally used for disk control or read/write commands. This way, one controller can now, use its normal (natural) interface to communicate with the other controller, --both controllers being coupled to the two ports of each disk drive. This novel natural linkage allows a disk control unit (controller) to request or transmit information to, or from, its companion controller via a selected disk drive in the already-present array of drives. Several useful, surprising advantages will be evident to workers (e.g. no special interfaces needed, only normal "IPI-2" interface as in FIG. 4).

And, unlike the aforedescribed "Shared Memory Linkage", so using a disk drive to transmit path control information, and to interrupt the other controller for updates, eliminates the need for dedicated RAM or other shared memory to maintain "data path control" and for other associated hardware and software. Workers will recognize that this direct, natural intercontroller linkage gives each controller a means of maintaining a resident copy of path-control information, while still maintaining a modicum of data security (at the subsystem). Further, only a minor part of disk-storage space is needed (e.g. I have found that a mere three sectors of track space on the maintenance cylinder can store all requisite data-path control information).

BRIEF DESCRIPTION OF DRAWINGS

FIG. 5 illustrates location and format for path control information.

FIG. 6 illustrates bit definitions for the path control sector.

FIG. 7 illustrates bit definitions for the path control word of FIG. 6.

FIGS. 9–11 shows the drive facility path mask.

Figure 1:
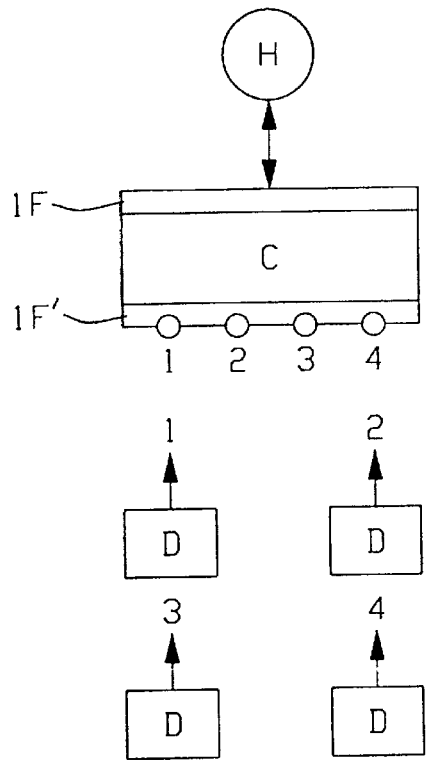
FIG. 1 shows associating an array of peripheral storage units with a host computer via an appropriate controller device.
Figure 2:
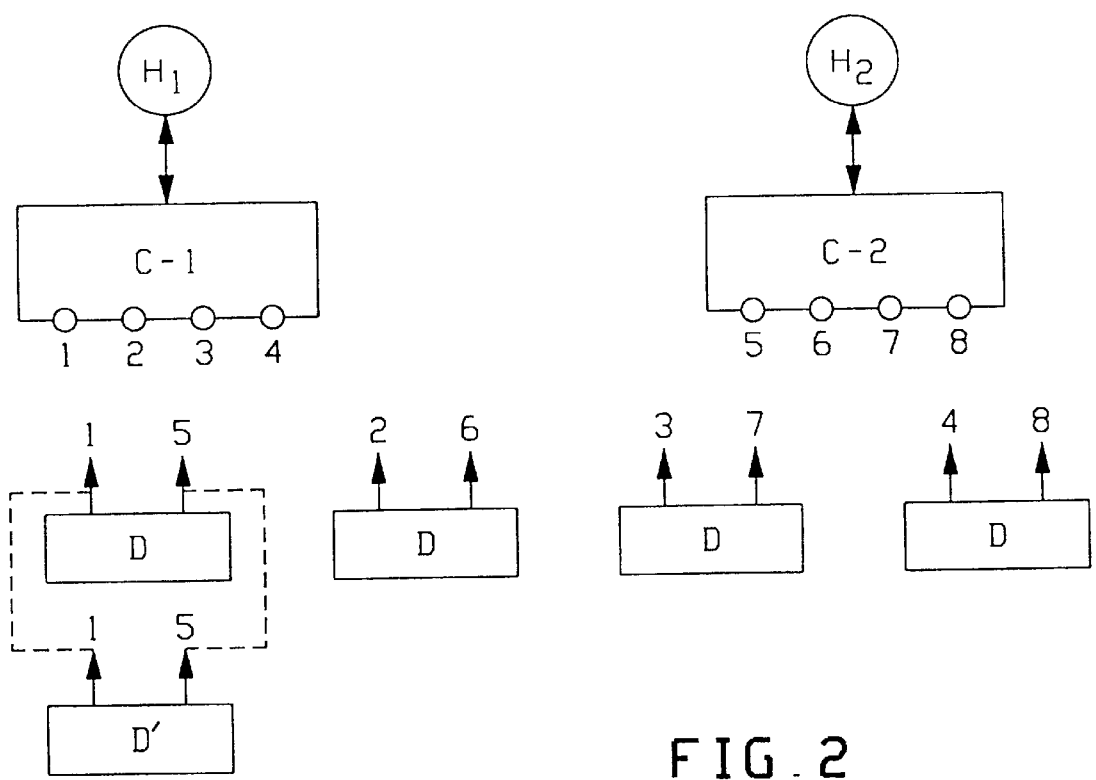
FIG. 2 shows associating an array of peripheral storage units with two or more host computer via an appropriate controller device.

Change the abstract of disclosure to read as follows:

A pair of data processing systems, each of the data processing system having a host central processor and an associated controller including memory, both of the data processing systems to be cooperatively associated with a number of disk drive memory units, each of the disk drive memory unit coupled to both said controllers. Either one of the host central processors can appropriate any one of the disk drive memory units as a selected disk drive memory unit by propagating path-control-data to the memory in both of the controllers and in the selected disk drive memory unit.

TRANSFER OF "PATH-CONTROL INFORMATION" (PCi)

I teach three prescribed ways of transferring PCi and so establishing control of a disk drive (i.e. setting-up or modifying Path Control); these may be characterized as: "Power-up", "Path Control Command" and "Port Address Command".

By "Power-up" one controller initializes all drive facilities and paths to 'none' (e.g. this controller has no logical facility paths), then requests "Path Control" from the other controller, for a given disk drive --and through that drive. The reason for so requesting Path Control is to maintain a duplicate copy in each controller.

By "Path Control command", a Host CPU will assign a path/s to the selected disk drive facility if that path is not already assigned. If that path is already assigned, the command will be rejected.

By "Port Address command" (with Priority Reserve op-modifier), a Host will assign a path to a selected drive regardless of the current path assignment (i.e. overriding any current path-assignment). The purpose of this command is to acquire the path to a drive that has already been reserved to a controller (e.g. that has lost its host or to release a drive when it is needed by the commanding host, commonly known as overriding or 'stealing').

Details of these three now follow.

1. By Power-UP: (Power, OFF-to-ON)

During power cycling (Power-UP, or OFF-to-ON), a controller is normally arranged and adapted to initialize itself and each disk drive attached. Transfer of PCi (Path Control information) is here arranged to begin for each disk drive at the end of this sequence.

An Initiating-controller initiates this PCi transfer by writing a "path control request" to its own memory (RAM, or Random Access Memory) and, as a copy, to a prescribed memory location in the "selected" Drive-Link (e.g. sector of a maintenance cylinder where "Path Control data" is stored). Then, the controller sends an interrupt-command, via this drive, to interrupt the other (Responding) controller, indicating that Path Control processing is underway. When the other (Responding) controller is interrupted, it reads the Path Control (p-c) data so-written to this drive to verify that a "valid request" was made --and, upon finding the request valid, it then reads its own internal copy (in its RAM), interrupt the Initiating-controller. and then writes the information to its prescribed Path Control data Storage area (i.e. in media of interrupting drive). Thus, the p-c data will be stored in a RAM of each controller and on the media of the selected drive.

FIG. 5 illustrates an exemplary location and format for "path control" information on a sector of the maintenance cylinder of a disk drive. For error detection, sectors 18–20 store duplicates of the information.

FIG. 6 illustrates "bit definitions" for the "path control" sector. Note: words 0 through 3 have fixed values that are commonly used/required for operation of a maintenance cylinder.

FIG. 7 illustrates bit definitions for the "path control word" of FIG. 6. (Note: MSB, or "most significant bit" is bit-15; LSB, or "least significant bit" is bit-zero.)

2. By "PATH CONTROL COMMAND"

Here, one (Initiating) controller receives a change-command from a host which instructs it to "select" a particular drive and change the Path Control (data) for the selected drive. Thereupon, the controller verifies that this change-command is valid, and then proceeds to write the Path Control (p-c) information to a designated area in its RAM memory, as its internal copy. The selected drive is commanded to read this p-c data and to write the requested information back onto its prescribed p-c data storage area (disk cylinder).

Then, the Initiating-controller sends a command, via this drive, to interrupt the other (Responding) controller, indicating that "Path Control processing" is underway. The other controller then reads the p-c data to verify that a valid command was made; whereupon, it then reads p-c data from the Interrupting drive and writes this data back into its own (RAM) memory.

Then this Responding-Controller sends a command, via the drive, to interrupt the Initiating-controller indicating that p-c information has been 'received'; whereupon the Initiating controller reads the Path Control information to verify that the response is correct (e.g. 'received' and valid) . . . if so, the Initiating-controller responds with a "change-completed" message to the initiating-Host, indicating successful execution of its Path Control change-command, ending this sequence.

3. By PORT ADDRESS COMMAND (priority reserve operation)

During this sequence, one (Initiating) controller receives a "takeover-command" from a host instructing it to force the selection of a drive, and then change the Path Control information for that drive (i.e. Host directs Controller to "steal a drive").

The controller verifies the validity of this command, and of the associated p-c information; then writes p-c information to a Path Control storage area in its RAM as this controllers internal copy. The drive is "selected"; it reads its internal copy of the p-c information and writes the requested information back onto its p-c information storage area. Thereupon, the controller sends a command to the drive to interrupt the other (Responding-) controller indicating that Path Control Processing is underway. When the other (Responding) controller is so interrupted, it reads the p-c data, verifies that a valid command was made (written) and then reads p-c information from the interrupting drive and writes the p-c information back into its associated memory (RAM).

Next, the Responding-Controller sends a command, via the drive, to interrupt the Initiating controller indicating that p-c information has been 'received'. Then, the Initiating controller reads the p-c information to verify that the response is correct (e.g. 'received'), and sends an appropriate reply to the Host ("takeover successful", or "takeover unsuccessful") to end this sequence.

This "Path Control" Feature allows a Host to "acquire" a drive without its being, physically reserved. This is accomplished through logical path assignments (IPI-3 port data path to drive) that were initially set up at "Power-Up" and later with a host-initiated path control type control command.

Figure 3:
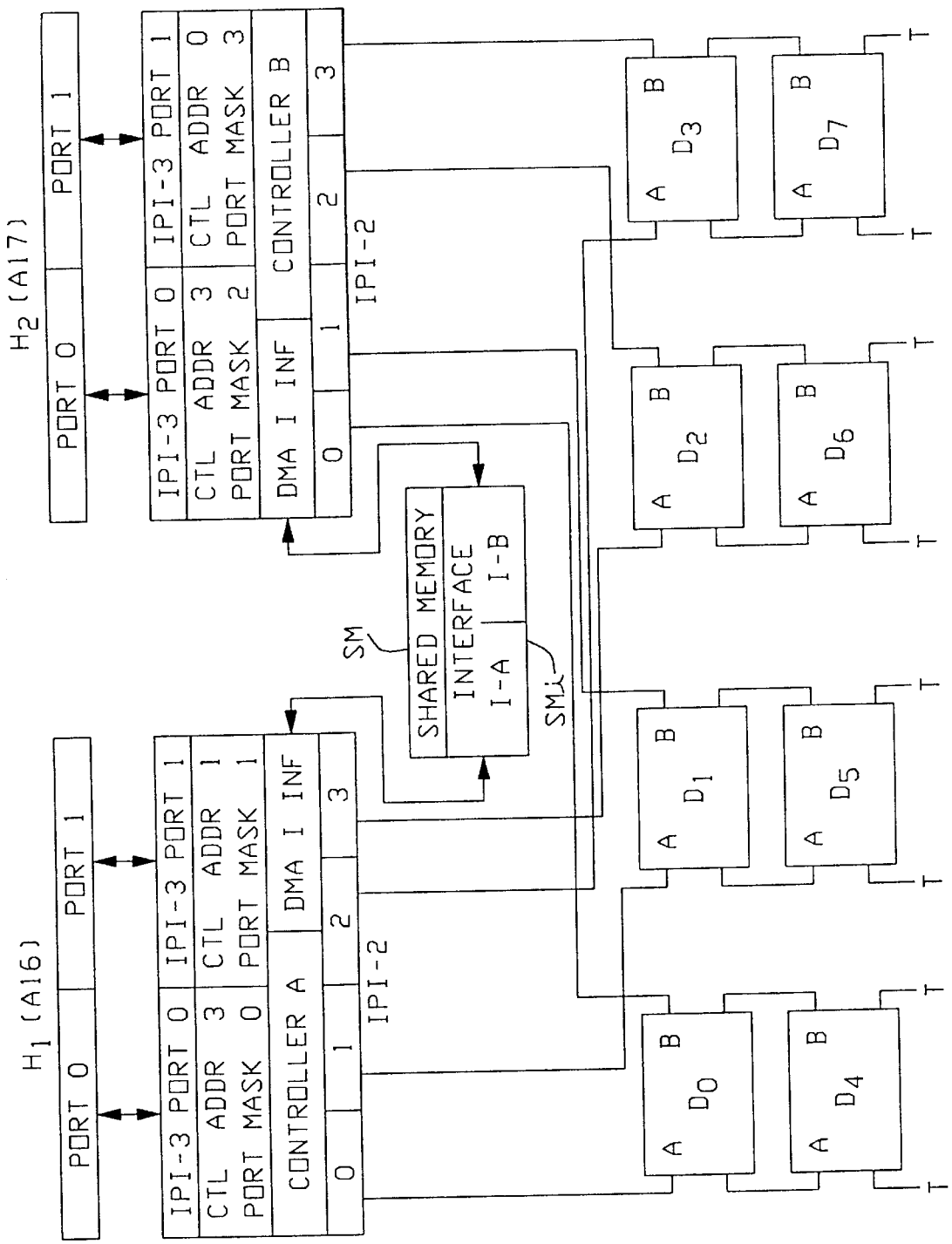
FIG. 3 shows Shared Memory Linkage.
Figure 4:
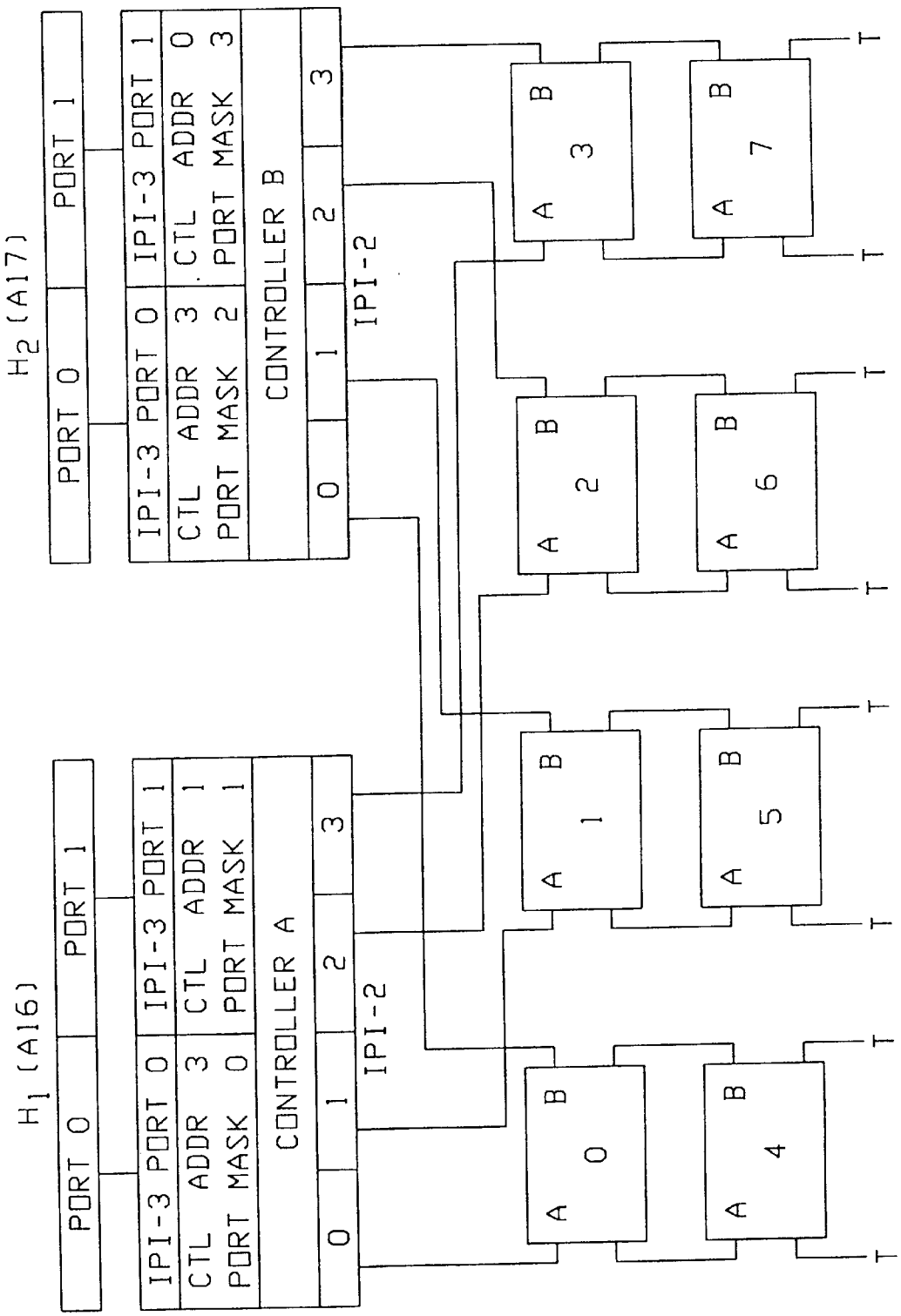
FIG. 4 shows Natural Linking.
Figure 8:
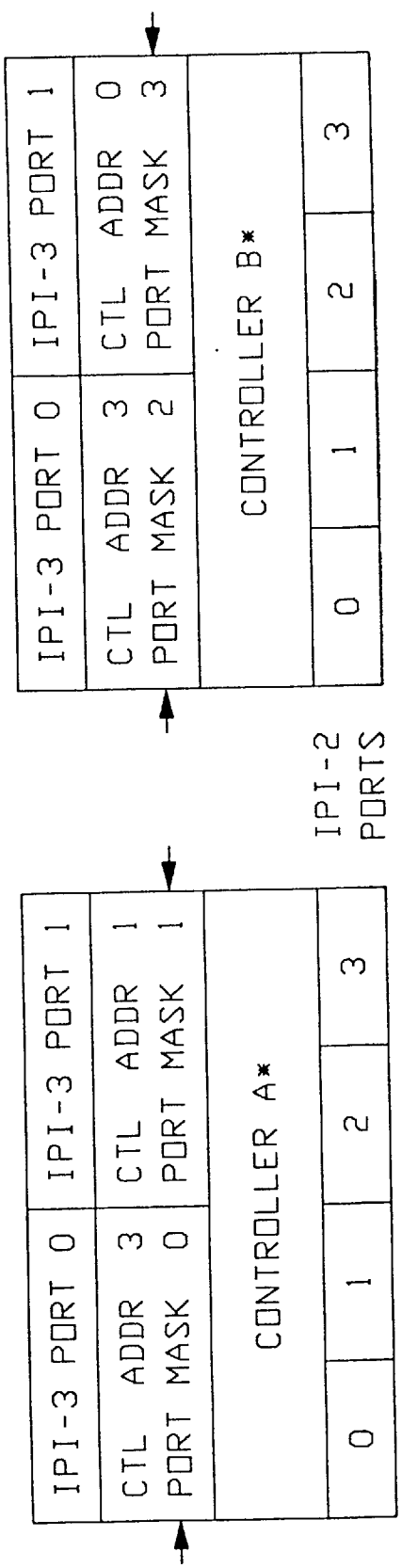
FIG. 8 shows port mask.

The logical path masks for controller and for the drives are as follows:

First, the IPI-3 port mask; there are four: each is assigned to a controller port (see port mask FIG. 8); Note, drives have even-numbered ports A, and odd-numbered B --also see FIG. 4. There are two IPI-3 ports per controller which can be assigned port mask (0 & 1) or (2 & 3) only, this is due to the physical connection of the controller's IPI-2 cable to the 'even' or 'odd' port of the drive facility (e.g. 'even' is assigned port mask 0 & 1). [See M9730 Installation or service directions for physical connection and editing the PCD, (peripheral configuration diagram), for this system and see illustrative FIG. 3 subsystem configuration.]

Once the PCD has been edited to reflect the subsystem configuration, the system knows the path assignment and will automatically maintain facility (drive) ownership once a drive has been acquired.

Figure 9:
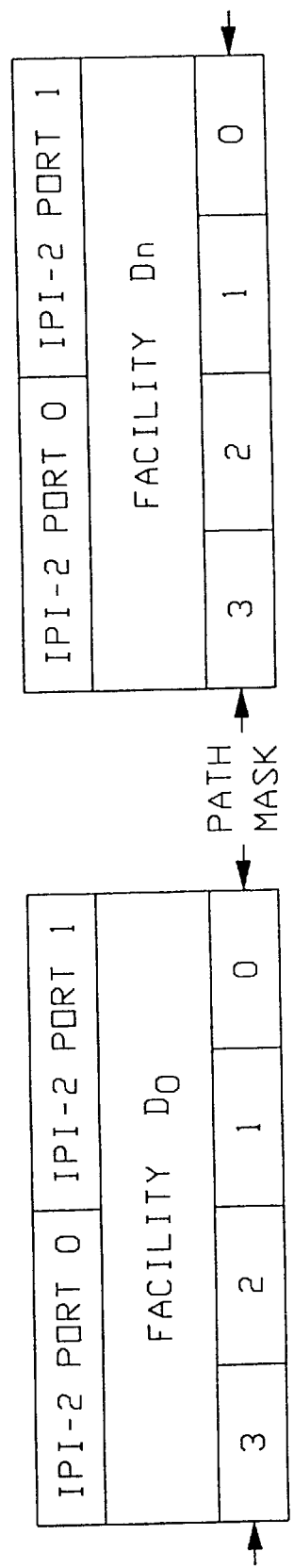

Second, the drive facility path mask: each drive has four logical paths available to it, depending on the last path control type command received (see FIGS. 9–11). This assignment plus the IPI-3 port mask assignment, together, enable (or disable) the data path to and from the selected drive facility. (Note: FIG. 9 illustrates two dual-ported drive facilities Do, Dn, with associated bit significant path mask; FIG. 10 illustrates the condition of a drive facility with all-four paths available for data transfer, while FIG. 11 illustrates the same with only one path available, through each controller, for data transfer.)

Some rules to be aware of:

1. Mixed port mask assignments (e.g. 0 & 2 or 1 & 3) is invalid.
2. The first IPI-3 port on each controller must have an even number (0 or 2) port mask assignment.
3. Connecting IPI-2 cables to both "even" and "odd" ports of facilities on one controller is invalid.

Once the "Path Control" has been executed, a path to the drive facility is established (typically, two) and is normally through two controllers that share the facility. This requires a duplicate copy of the Path Control for each facility to reside in each controller. This is accomplished automatically by the controller that received the Path Control type command or acquires it due to Power-Up.

The foregoing will illustrate how my invention dispenses with the need for any special added mediating (linking) means, for controllers to communicate; rather, using one of the units in a memory array to transmit path-control information, while interrupting a companion controller for updating.

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related control systems. Also, the present invention is applicable for enhancing other memory arrays related arrangements.

The above examples of possible variations of the present invention are merely illustrative. Accordingly, the present invention is to be considered as including all possible modifications and variations coming within the scope of the invention as defined by the appended claims.

What is claimed is:

1. An arrangement for allocating a disk drive memory unit to a selected controller in a pair of data processing systems, each said data processing system having a host central processor and an associated controller including memory, both said data processing systems to be cooperatively associated with a number of disk drive memory units, each said disk drive memory unit coupled to both said controllers, whereby either one of said host central processors can appropriate any one of said disk drive memory units as a "selected" disk drive memory unit by propagating "path-control-data" to the memory in both said controllers and in the selected disk drive memory unit, the arrangement further comprising:

propagate means for propagating command signals and said "path control data" from one of said host central processors to the associated controller and its memory as the "selected" controller to allocate one of said disk drive memory units as the "selected" disk drive memory unit;

interrupt means for interrupting the other controller by sending a command from said selected controller;

transmit means for sending a command by said other controller via said selected disk drive memory unit to said selected controller indicating that the information is received; and signal means for indicating successful allocation by said selected controller to said one of said host central processors.

2. An array for allowing a selected controller in a pair of data processing systems to take over a disk drive memory unit, each said data processing system having a host central processor and an associated controller including memory, both said data processing systems to be cooperatively associated with a number of disk drive memory units, each said disk drive memory unit coupled to both said controllers, wherein either one of said host central processors can appropriate any one of said disk drive memory units as a "selected" disk drive memory unit by propagating "path-control-data" to the memory in both said controllers and in the selected disk drive memory unit, this array further comprising:

propagate means for propagating command signals and said "path control data" from one of said host central processors to the associated controller and its memory as the "selected" controller to allocate a predetermined one of said disk drive memory units as the "selected" disk drive memory unit;

interrupt means for interrupting the other controller by sending a command from a said selected controller via said selected disk drive memory unit;

transmit means for sending a command by said other controller via said "selected" disk drive memory unit to said "selected" controller indicating that the information is received; and indicate means for indicating successful take-over by said "selected" controller to said one of said host central processors.

3. An arrangement for taking over a "selected" disk drive in a system comprised of a pair of host computer systems, each of the said host computer systems having an associated controller and controller memory, there being N such disk drives, each being similar and coupled to both said computer systems, this arrangement further comprising;

initiate means for causing a selected one of said host computer systems to propagate first signals and "path control data" to a said associated controller by way of indicating this as the "selected" controller and of designating one of said disk drives as the "selected" disk drive, with said "path control data" being stored in said memory of said "selected" controller;

with said "selected" disk drive adapted to read said "path control data" from said memory of said selected controller, and to store said "path control data"; responsive to second signals from said selected controller;

interrupt means for causing the other controller to be interrupted by third signals from said "selected" controller, said third signals being sent via said selected disk, to read said "path control data" from said selected drive and to store said path control data, and also to acknowledge receipt of said path control data to said selected controller via said selected disk drive; and signals means for causing said selected controller to indicate successful drive allocation to its own host system.

\* \* \* \* \*